United States Patent
Kurtz et al.

(10) Patent No.: US 8,040,831 B2
(45) Date of Patent: Oct. 18, 2011

(54) METHOD AND SYSTEM FOR CONTROL CHANNEL BEAMFORMING

(75) Inventors: Brian L. Kurtz, Addison, TX (US); Hang Jin, Plano, TX (US); Weidong Yang, Plano, TX (US); Daniel Wee, Garland, TX (US); Philip B. Davis, Richardson, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1105 days.

(21) Appl. No.: 11/364,689

(22) Filed: Feb. 27, 2006

(65) Prior Publication Data

US 2008/0167075 A1    Jul. 10, 2008

Related U.S. Application Data

(60) Provisional application No. 60/658,801, filed on Mar. 4, 2005.

(51) Int. Cl.
*H04B 7/185* (2006.01)

(52) U.S. Cl. ........ 370/318; 370/328; 370/334; 370/522; 455/525; 455/515; 455/562.1; 455/63.4; 455/101

(58) Field of Classification Search .......... 370/318, 370/328, 334, 522; 455/561, 525, 435.1
See application file for complete search history.

(56) References Cited

U.S. PATENT DOCUMENTS

| | | | |
|---|---|---|---|
| 6,330,459 B1 | 12/2001 | Crichton et al. | 455/562 |
| 7,126,531 B2 * | 10/2006 | Nakaya et al. | 342/377 |
| 2002/0086707 A1 * | 7/2002 | Struhsaker et al. | 455/561 |
| 2003/0100343 A1 | 5/2003 | Zourntos et al. | 455/562 |
| 2005/0037799 A1 * | 2/2005 | Braun et al. | 455/525 |
| 2005/0181728 A1 * | 8/2005 | Hansen et al. | 455/41.2 |
| 2005/0272472 A1 * | 12/2005 | Goldberg et al. | 455/562.1 |
| 2005/0286547 A1 * | 12/2005 | Baum et al. | 370/437 |
| 2005/0287978 A1 * | 12/2005 | Maltsev et al. | 455/403 |
| 2006/0203792 A1 * | 9/2006 | Kogiantis et al. | 370/343 |

* cited by examiner

*Primary Examiner* — Kamran Afshar
*Assistant Examiner* — Kathy Wang-Hurst

(57) ABSTRACT

A system and method for managing control information in a wireless communications system. The method comprises broadcasting a predetermined number of preambles through beamforming from a base station, detecting, by a subscriber station, a predetermined frame associated with one selected preamble that has the highest power level, and identifying one or more subcarriers for carrying control information through the selected preamble.

19 Claims, 5 Drawing Sheets

METHOD AND SYSTEM FOR CONTROL CHANNEL BEAMFORMING

CROSS REFERENCE

This application claims the benefits of U.S. Patent Application Ser. No. 60/658,801, which was filed on Mar. 4, 2005 and entitled "Transparent Control Channel Beamforming."

FIELD OF THE INVENTION

This invention relates generally to telecommunication systems, and more particularly to applying beamforming to control information of the telecommunication systems through an antenna array.

BACKGROUND

In communication systems, whether they conform to GSM, CDMA, or other technology standards, the communications between the base stations and the mobile terminals typically include one or more traffic channels for communicate traffic data and one or more control channels for exchanging control information or control signals. For some control channels, for example, a pilot channel of CDMA systems, the control information has to be broadcasted omni-directionally to cover the whole or sectored cell. On the other hand, it is desirable to steer narrow beam formed for communicating through traffic channels with specified mobile equipments without interfering others nearby. The beam formed pattern for the traffic data is directed to particular users, and it has a narrow beam width.

The narrow beam width beamforming provides a roughly 9 db performance advantage for the traffic data over control data, as traffic data can be aimed at specific user(s), but control data must be sent to everyone under the coverage of the telecommunication system.

WiMAX is a standards-based wireless technology that provides high-throughput broadband connections over long distances. WiMAX can be used for a number of applications, including "last mile" broadband connections, hotspots and cellular backhaul, and high-speed enterprise connectivity for business.

WiMAX has a special mode to improve control channel efficiency called Diversity Map Scan. This mode is intended to balance the link budget of the control channel for systems using beamforming for traffic data. Unfortunately, without an appropriate scheme, the benefits of beamforming are reduced by high overhead and un-realized range.

When in the Diversity Map Scan mode, the communications system operates by transmitting multiple narrowband signals (called AAS-DLFPs) one after the other in the time domain. FIG. 1 illustrates a frame 100 containing an AAS Diversity Map Zone 102 therein. It illustrates a four-antenna configuration where the AAS preamble and AAS DL MAPs structure are repeated four times to support the corresponding four groups of users. The downlink (DL) subframe includes a non-AAS section and an AAS section specified by information elements provided in a DL MAP. Within the AAS zone, subchannel numbers 4 and N−4 (N is the index for the last logical subchannel) are allocated to the AAS DL MAP where AAS MAP allocations are specified for AAS users.

Within the AAS zone, the AAS BS specifies allocations to be used for Subscriber Station (SS) Ranging. In Time Division Duplex mode, a base station (BS) of the communications system can extract the channel information required for beamforming from Ranging Request messages received from the SS's. In Frequency Division Duplex mode, beamforming is done through AAS Feedback Request and Response messages where channel response information along with information regarding Received Signal Strength Indicator (RSSI) and Carrier to Interference plus Noise Ratio (CINR) are reported back to the BS by the SS.

Each SS must listen to the first preamble of the frame, then looks in a defined zone for additional preambles which indicate the location of these AAS-DLFPs, which must be independently decoded by the SS. After up to 16 AA-DLFPs have been analyzed, the SS picks the best one and reports to the BS which AAS-DLFP had the best signal. The AAS-DLFP then points to a private map with the control information. From this point forward, the BS transmits the control information on the private map until channel conditions force a change.

What is needed is an improved method and system for effectively enhance the communication for the control information between the base station and the subscriber station using beamforming in a wireless communications system.

SUMMARY

A system and method for managing control information in a wireless communications system. The method comprises broadcasting a predetermined number of preambles through beamforming from a base station, detecting, by a subscriber station, a predetermined frame associated with one selected preamble that has the highest power level, and identifying one or more subcarriers for carrying control information through the selected preamble.

Comparing the benefits of the techniques describe herein with the conventional Diversity Map Scan in WiMAX systems, the capacity of the frequency spectrum in the downlink are saved by not transmitting narrow band AAS-DLFPs through all subcarriers. There will also no additional data processing required as the SS would not notice the beamforming process carried out by the BS. In addition, a link budget gain is achieved due to the beamforming or diversity.

DETAILED DESCRIPTION OF THE INVENTION

Figure 1:
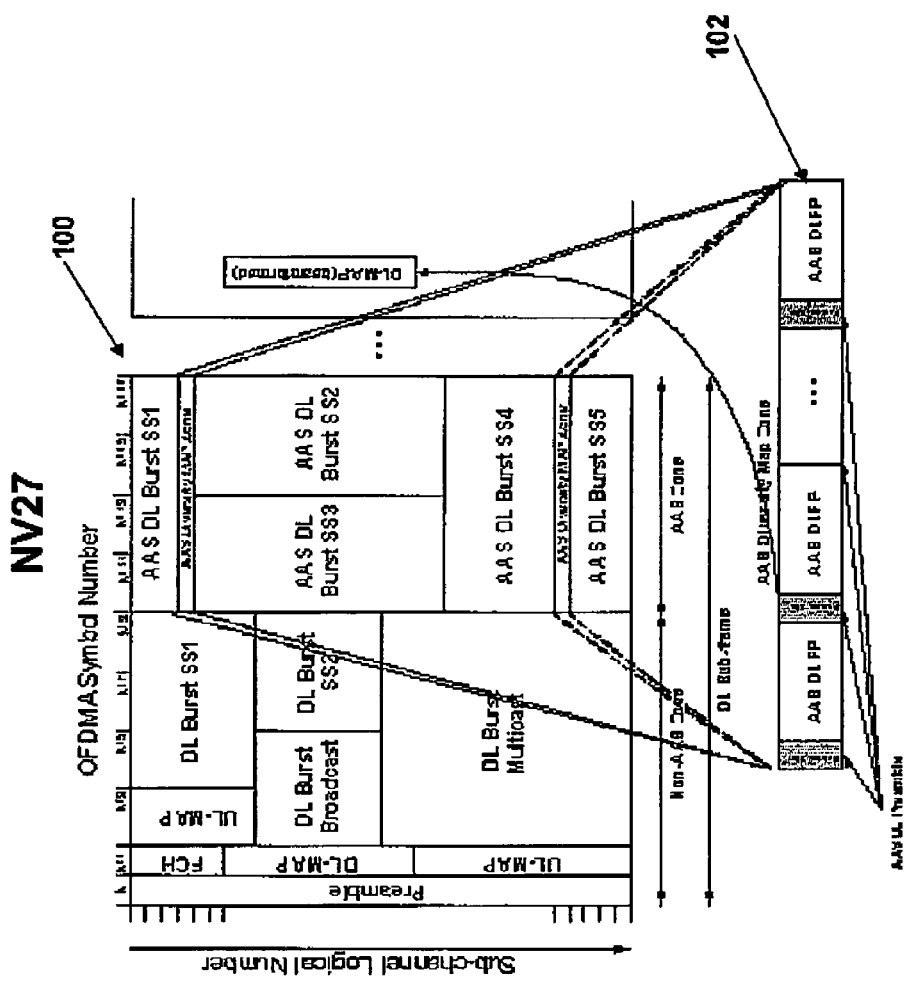
FIG. 1 is an illustration of a data frame with an AAS Diversity Map Zone.

Embodiments are illustrated below with regard to a few limited examples. It is to be understood that the techniques described herein are applicable to any multiple access technologies which implement frequency division for multiple access channelization. Such access technologies include Frequency Division Multiple Access (FDMA), Time Division Multiple Access (TDMA), Code Division Multiple Access (CDMA), and Orthogonal Frequency Division Multiplex (OFDM) systems and any combination thereof, whether synchronized or unsynchronized, using Frequency Division Duplex (FDD) or Time Division Duplex (TDD).

Few wireless systems employ adaptive beamforming for data traffic. Wireless communication systems that adaptively beamform data signals to specific users can gain significant advantages in performance over omni-directionally transmitted signals. This benefit cannot normally be extended to the control channels that allow users to join the network, or determine the location of their beamformed data. This limitation creates an imbalance in any wireless system that uses adaptive beamforming.

In the few systems that have implemented such feature, there exists many proprietary means of transmitting control channel information, but all require special means for feeding back the quality of the control channel in order to ensure proper operation, and that the base station (BS) is transmitting the control information in an acceptable manner. Described herein are a method and system for applying beamforming to the control channel, which does not affect any receiving mechanism used by the subscribe station (SS) (or is "transparent" to the SS) of the wireless systems. Techniques are further provided to allow the SS to detect its best means for getting control traffic information without any additional effort beyond normal system synchronization. The techniques described herein also provide various benefits including enhancing system ranging process, and improving the system capacity.

Unlike any existing systems which may require the SS to detect a control channel in which it can operate, and then feeds that information back to the BS, a method and system are described herein for the BS to send preambles and control information through a beamforming process so that an SS can independently detect a beam that provides the best signal, which further allows the SS to receive control information on this beam from the BS. The techniques described herein are particularly useful in a communications system that operates with a standard protocol, as it is almost impossible to alter a broadcast specification in order to implement a custom control channel.

In a wireless system operable with the techniques describe herein, information is normally organized within a frame. There are frequency bands that are known as subcarriers, the subcarriers can be for data transmission, for pilot information for various estimation and synchronization purposes, or for reserved purposes such as those that carry no transmission at all or used for guard bands. Out of all subcarriers, there are active subcarriers that participate in the communication between the BS and SS. The active subcarriers are divided into subsets of subcarriers called subchannels. The subcarriers forming one subchannel can be, but does not have to be, adjacent. The subchannels are the units in which bandwidth and MAP allocations are done. There are also different operation modes for both uplink and downlink communication operations. For example, there are DL Fully Used Subchannelization (FUSC), and DL Partially Used Subchannelization (PUSC) for downlink data operation modes. Another operation mode is known as Advanced Modulation and Coding (AMC) method that uses adjacent subcarriers to form subchannels.

Switching between two operation modes, which is known as zone switching, is supported by the WiMAX systems. For example, there may be multiple subcarrier allocation zones within the same frame to enable the possibility of support for and coexistence of different types of SS's. The switching is performed using an information element included in DL-MAP and UL-MAP. For instance, if DL and UL subframes both start in the PUSC mode where groups of subchannels are assigned to different segments by the use of dedicated FCH messages, the PUSC subcarrier allocation zone can be switched to a different type of subcarrier allocation zone as guided by the PUSC DL-MAP.

Figure 2:
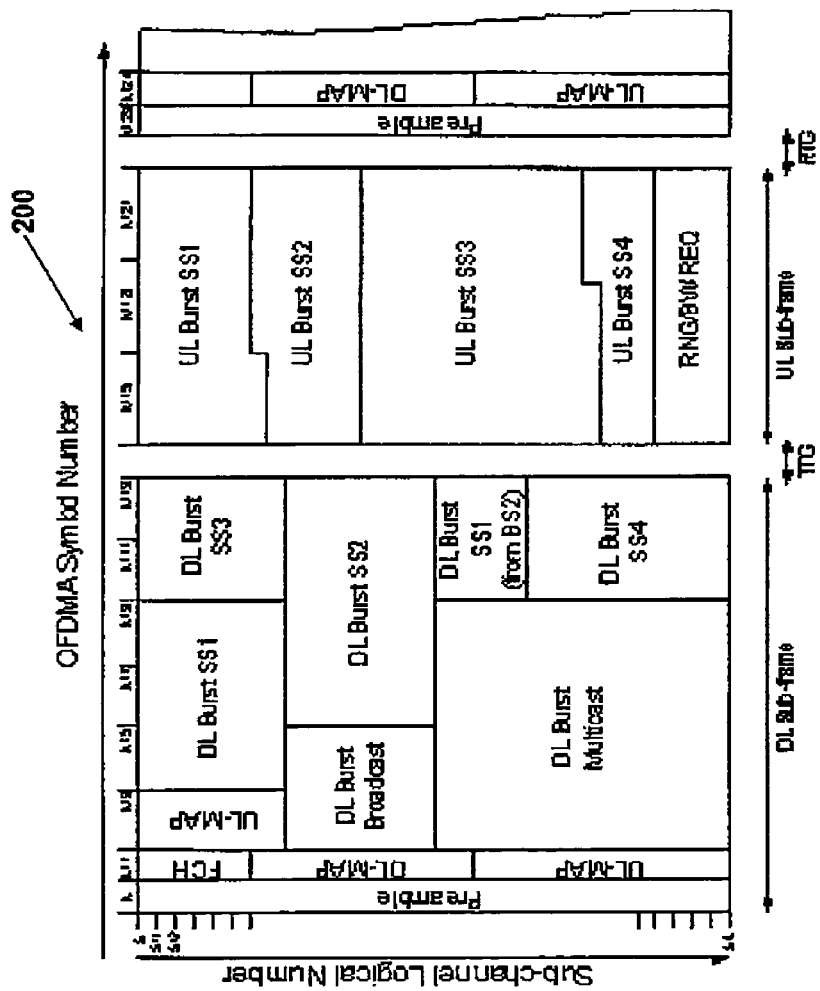
FIG. 2 illustrates a sample OFDM frame structure for Time Division Duplexing (TDD) mode.

FIG. 2 illustrates a sample OFDM frame structure 200 for Time Division Duplexing (TDD) mode. Each frame is divided into DL and UL subframes separated by Transmit/Receive and Receive/Transmit Transition (TTG and RTG, respectively) gaps. Each DL subframe starts with a preamble followed by the Frame Control Header (FCH), the DL-MAP, and a UL-MAP, respectively. The FCH contains the DL Frame Prefix (DLFP) to specify the burst profile and the length of the DL-MAP immediately following the FCH. The DLFP is a data structure transmitted at the beginning of each frame and contains information regarding the current frame.

As stated above, the frame is preceded by a preamble. The purpose of having a preamble is for detecting the start of the frame, and performing any necessary frequency or timing adjustments. The method of detecting a preamble is well understood. For example, it can be accomplished by correlating a received signal with a known preamble sequence and searching until a predetermined signal peak is found. Once the preamble has been located, the SS has a reference point that can be used to locate a portion of the frequency spectrum where control data is always placed by the BS.

Most systems operate with a single preamble, and each user will detect the same preamble and thus will look in the same selected spectrum for their control channels. Beamforming the control channel in such systems has never been contemplated as the BS is forced to broadcast as broadly as possible in order for every subscriber station to receive its necessary control information.

Unlike the conventional systems, the techniques describe herein multiple preamble sequences to be broadcasted in a wireless communication system with each implying a specific and unique corresponding spectrum location (e.g., a set of subcarriers) for the control information. According to one embodiment, the multiple preambles are set to be orthogonal, and each preamble is beamformed in a different manner. On the receiving side, when the multiple preambles are transmitted through beamforming aiming at different SSs under the coverage, a particular SS detects one of the preambles at a power detectably higher than the others. Through the best preamble sequence received by the SS, the location of the corresponding control information can be directed by such preamble. Once the SS has received its control information, the BS can then allocate each SS a predetermined spectrum anywhere within the overall system spectrum.

The beamforming process with multiple preambles in a wireless communications system provides various benefits. First, the resource used for broadcasting control information or the control channel overhead is significantly reduced, as the control information is now beamformed toward only to a subset of the total number of SSs in a system. For example, the energy level required for broadcasting such information can be reduced. By beamforming the control information, additional link budget is provided for the ranging process of the system.

Figure 3:
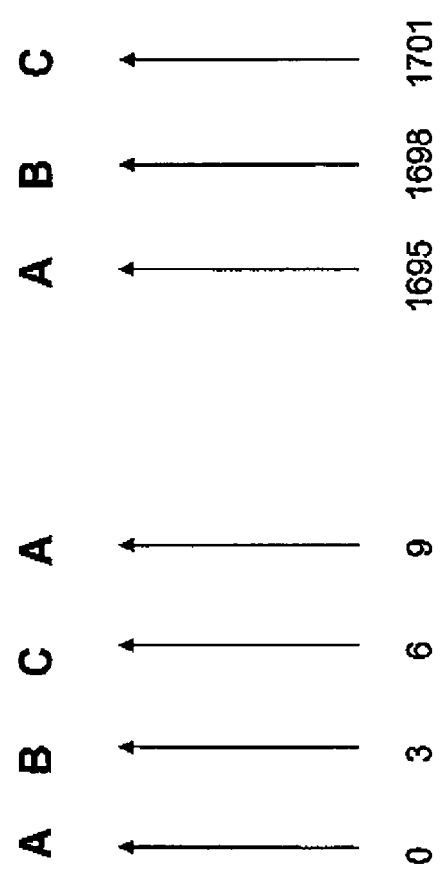
FIG. 3 illustrates a distribution of different preambles on different subcarriers according to one embodiment.

For the examples described herein, it is assumed that the wireless communication system conforms to the IEEE802.16d specification, which allows for preambles to be broadcast on every third subcarrier for an OFDMA system. FIG. 3 illustrates a distribution of the subcarriers in three segments with regard to three different preambles in the OFDMA system.

In the described embodiment, three preambles would be transmitted sequentially utilizing all the carriers available in the system. As shown, the first preamble uses the subcarriers 0,3,6,9 with the second preamble using subcarriers 1,4,7,10 and the third preamble using subcarriers 2,5,8,11 . . . . In the intended operation, each preamble provides guidance for the location of the frame and the location of the control information. The three preambles are transmitted using different sets of beamforming weights on phase and magnitude, which provides three unique radiation patterns.

Figure 4:
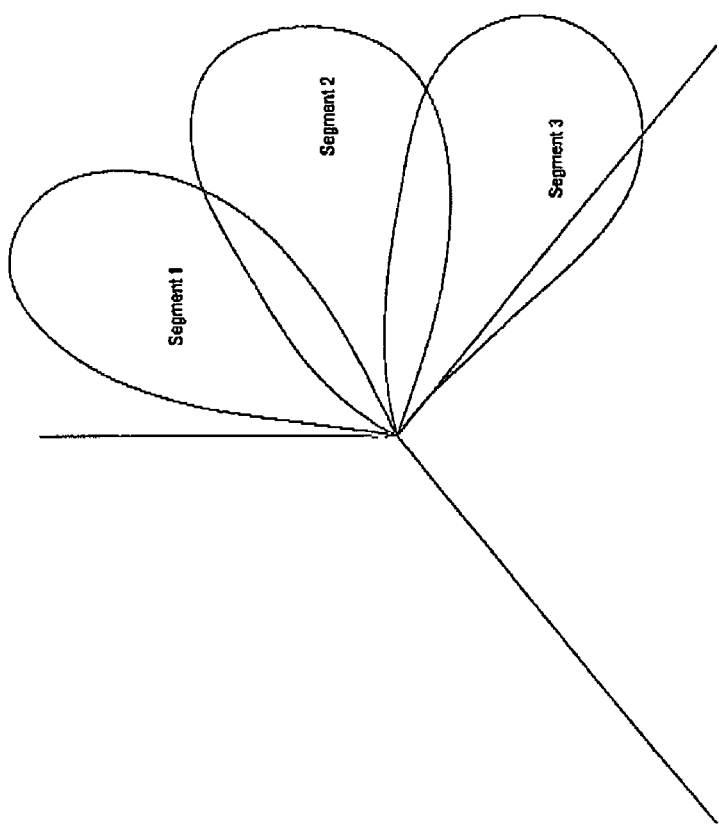
FIG. 4 illustrates a sample radiation patterns after beamforming the preambles according to one embodiment.

FIG. 4 illustrates representations of three radiation patterns after the beamforming process. After the processing conducted by the BS, three segments are provided, with each segment corresponding to a group of subcarriers using a particular preamble, which further corresponds to certain control information.

On the receiving end, when the SS detects all the three broadcast segments from the BS, it does not know that the BS has performed additional beamforming, and simply responds to one segment thereof as it has the highest power level for it. In fact, the techniques described herein are intended not to require any additional processing for the SS as long as it does the conventional detection. For example, when an SS is under the coverage of 3 BSs, which may be spaced equally from the SS, the SS receives 3 preambles. The SS detects one of them as usual, but it will choose the best beam pattern, not necessarily from the best BS.

From the preamble the SS detects, the SS further locates the implied location of its control information, which includes the location of a unique ranging channel. By using the ranging channel to communicate to the BS of its identity, the BS would be able to discover which radiation pattern an SS responded to, and continues the communication therebetween. The BS can communicate to the SS through a broadly beamformed control channel specifically directed to the SS.

Unlike Diversity Map Scan, the SS doesn't have to do any additional work to find the correct radiation pattern. That is, the BS does not have to waste any resource to inform the SS about its beamforming process. The SS simply searches for the preambles and synchronizes to the radiation pattern/preamble with the best signal. The synchronized preamble indicates the location of the control channel information, essentially performing the same task as the AAS-DLFP without requiring additional SS processing, and without wasting spectrum for multiple AAS-DLFPs.

Figure 5:
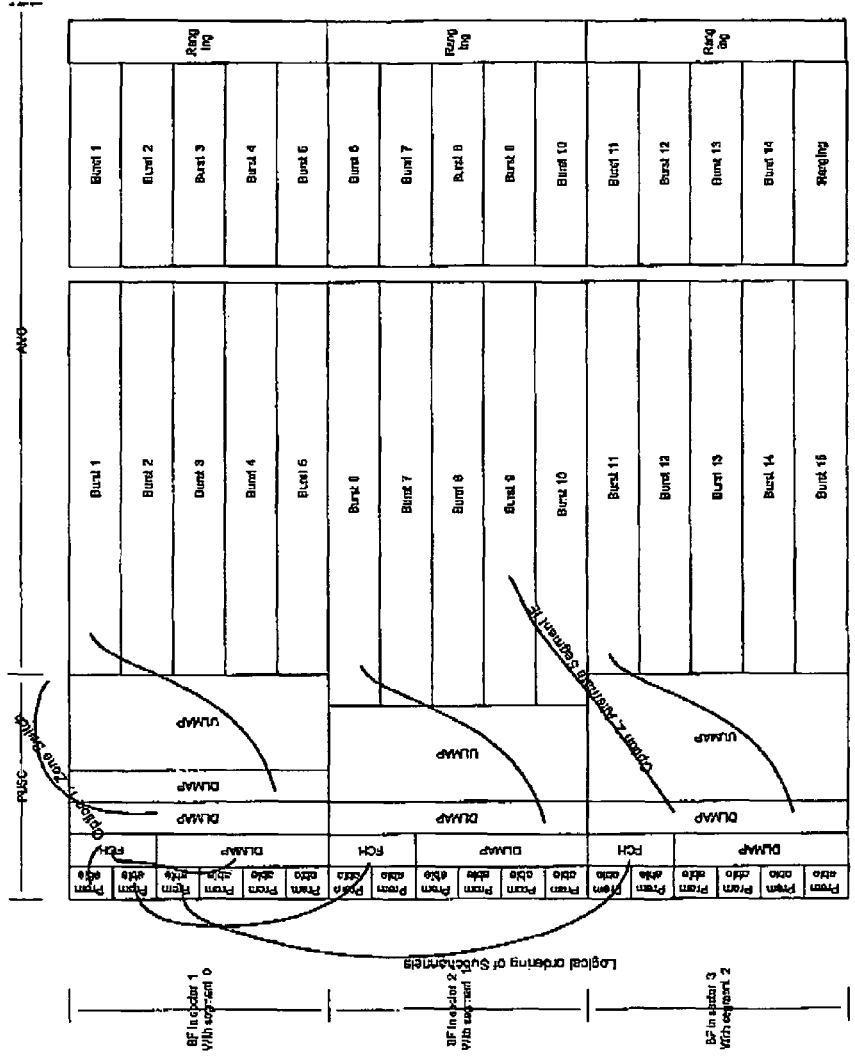
FIG. 5 illustrates a frame conforming to IEEE 802.16 standard according to one embodiment.

FIG. 5 illustrates shows how a frame 500 might be constructed conforming to the IEEE802.16 standard according to one embodiment. The arrows in FIG. 5 indicate that a predetermined preamble points to a predetermined FCH, which further associates with a DLMAP and/or ULMAP, which indicate the location of the first data burst. For example, there are three interlaced preambles used by the wireless communication system, and each, as a pointer, points to a unique FCH, which allows the SS to locate its control information on certain selected subcarriers. After the SS has decoded its control information either through the DLMAP or ULMAP, the traffic channel is established through uplink and downlink bursts. The traffic channel can be established in the same spectrum in which the control information is received, or in a different spectrum, which may contain control information for other SSs. It is also understood that a DLMAP or ULMAP may points to a set of subcarriers that are not designated currently within the beamformed segment. The DLMAP may also provide a "zone switch", switching from the PUSC mode to the AMC mode or vice versa.

The techniques described herein provide a method and system to transmit multiple wideband preambles at the same time with different radiation patterns. Comparing the benefits of the techniques described herein with the conventional Diversity Map Scan in WiMAX systems, the capacity of the frequency spectrum in the downlink are saved by not transmitting narrow band AAS-DLFPs through all subcarriers. There will also no additional data processing required as the SS would not notice the beamforming process carried out by the BS. In addition, a link budget gain is achieved due to the beamforming or diversity. Also, since the control channels can now be broadly beamformed, less repetition on the control channel is necessary, thereby reducing overhead and freeing more spectrum for data traffic. Furthermore, because the Diversity Map Scan occupies a narrow band for the entire downlink period, the private map information must be located in different spectrum, which may create problems in a fading channel. In contract, because of the nature of the wideband control channel, it would exist in the same spectrum as the wideband preamble, thus experiencing the same fading.

Described herein are many different embodiments, or examples, for implementing control channel beamforming. Also, specific examples of components and processes are described to help clarify the embodiments describe herein. For example, the above described process can be applied to generate more than two patterns if needed. These are, of course, merely examples and are not intended to be limited to just the techniques described herein.

While the techniques describe herein have been particularly shown and described with reference to the preferred embodiment thereof, it will be understood by those skilled in the art that various changes in form and detail may be made therein without departing from the spirit and scope of the invention.

What is claimed is:

1. A method comprising:
   at a base station, dividing a coverage area into a number of segments;
   assigning a unique set of transmit subcarriers from a plurality of subcarriers for multiple subcarrier transmission to each of the segments;
   applying beamforming to each of the unique sets of transmit subcarriers to form a transmit beam pattern for each segment, wherein each unique set of beamformed transmit subcarriers has control information carried in a subset of subcarriers within a corresponding unique set of beamformed transmit subcarriers; and
   transmitting a different predetermined preamble to each of the segments using a corresponding unique set of beamformed transmit subcarriers, wherein each different preamble is configured to indicate to a subscriber station a spectrum location of the subset of subcarriers carrying the control information within the corresponding unique set of beamformed transmit subcarriers; and
   receiving a response from a subscriber station indicating a selected preamble detected at a highest power level by the subscriber station.

2. The method of claim 1, wherein receiving comprises receiving the response from the subscriber station over a unique ranging channel determined by the subscriber station using information contained in the selected preamble.

3. The method of claim 2, further comprising at the base station, identifying the subscriber station based on the unique ranging channel obtained in the received response.

4. The method of claim 1, further comprising at the subscriber station identifying a frame control header field associated with the selected preamble which allows the subscriber station to locate the subset of subcarriers to obtain the control information.

5. The method of claim 4, wherein the frame control header field further indicates a downlink-MAP (DL-MAP) or an uplink-MAP (UL-MAP).

6. The method of claim 1, wherein transmitting comprises transmitting preambles that are configured to be orthogonal to each other.

7. The method of claim 5, further comprising at the subscriber station, identifying one or more predetermined subcarriers for a traffic channel using the DL-MAP or the UL-MAP.

8. A method comprising:
at a base station in a wireless communications system, dividing a coverage area into a predetermined number of segments;
assigning a unique set of transmit subcarriers from a plurality of subcarriers for multiple subcarrier transmission to each of the segments;
applying beamforming to each of the unique sets of transmit subcarriers to form a transmit beam pattern for each segment, wherein each unique set of beamformed transmit subcarriers has control information carried in a subset of subcarriers within a corresponding unique set of beamformed transmit subcarriers;
transmitting a different predetermined preamble to each of the segments using a corresponding assigned unique set of beamformed transmit subcarriers, wherein each different preamble is configured to indicate to a subscriber station a spectrum location of the subset of subcarriers carrying the control information;
detecting, by a subscriber station, one of the different predetermined preambles that has a highest power level;
identifying one or more subcarriers carrying the control information based on information contained in the detected preamble; and
continuing communication between the base station and the subscriber station based on the control information.

9. The method of claim 8, further comprising sending data from the subscriber station to the base station through a predetermined ranging channel identified through the selected preamble.

10. The method of claim 9, further comprising:
detecting the predetermined ranging channel used by the subscriber station; and
providing the control information on the identified subcarriers.

11. The method of claim 8, wherein identifying further includes identifying a frame control header field associated with the selected preamble which allows the subscriber station to locate the subset of subcarriers to obtain the control information.

12. The method of claim 11, wherein the frame control header further points to a downlink-MAP or an uplink-MAP.

13. The method of claim 8, wherein transmitting comprises transmitting the predetermined preambles that are configured to be orthogonal to each other.

14. The method of claim 8, further comprising identifying one or more predetermined subcarriers for a traffic channel.

15. The method of claim 1, wherein dividing comprises dividing the coverage area into the number of segments based on subscriber stations in the coverage area.

16. The method of claim 15, wherein applying comprises applying beamforming to each unique set of transmit subcarriers in order to form a transmit beam pattern aimed at individual subscriber stations.

17. The method of claim 1, further comprising continuing communication between the base station and the subscriber station based on the control information contained in the selected preamble without the base station transmitting Adaptive Antenna System-Downlink Frame Prefixes that are normally required when the base station is in a Diversity Map Scan mode used for specifying allocations for subscriber station ranging.

18. The method of claim 8, wherein at the base station the continuing communication is performed without the base station transmitting Adaptive Antenna System-Downlink Frame Prefixes that are normally required when the base station is in a Diversity Map Scan mode used for specifying allocations for subscriber station ranging.

19. The method of claim 1, wherein transmitting comprises transmitting different preambles that are each configured to point to a unique frame control header that is configured to allow a subscriber station to locate the subset of subcarriers.

* * * * *